United States Patent
Richardson et al.

(10) Patent No.: US 9,369,717 B2
(45) Date of Patent: Jun. 14, 2016

(54) SYSTEMS AND METHODS FOR ENCODING, TRANSMITTING AND DECODING

(75) Inventors: Iain E. Richardson, Aberdeen (GB); Maja Bystrom, Belmont, MA (US)

(73) Assignee: BEVARA TECHNOLOGIES LLC, Belmont, MA (US)

( * ) Notice: Subject to any disclaimer, the term of this patent is extended or adjusted under 35 U.S.C. 154(b) by 163 days.

(21) Appl. No.: 13/237,673

(22) Filed: Sep. 20, 2011

(65) Prior Publication Data

US 2012/0069911 A1    Mar. 22, 2012

Related U.S. Application Data (60) Provisional application No. 61/443,658, filed on Feb. 16, 2011, provisional application No. 61/384,686, filed on Sep. 20, 2010, provisional application No. 61/387,327, filed on Sep. 28, 2010, provisional application No. 61/443,660, filed on Feb. 16, 2011.

(51) Int. Cl.
| | |
|---|---|
| *H04N 19/12* | (2014.01) |
| *H04N 19/162* | (2014.01) |
| *H04N 19/70* | (2014.01) |
| *H04N 19/46* | (2014.01) |
| *H04N 19/164* | (2014.01) |
| *H04N 19/44* | (2014.01) |
| *H04L 29/06* | (2006.01) |

(52) U.S. Cl.
CPC ............ *H04N 19/12* (2014.11); *H04L 65/1059* (2013.01); *H04L 65/604* (2013.01); *H04L 65/607* (2013.01); *H04N 19/162* (2014.11); *H04N 19/164* (2014.11); *H04N 19/44* (2014.11); *H04N 19/46* (2014.11); *H04N 19/70* (2014.11)

(58) Field of Classification Search
CPC .......... H04N 7/26069; H04N 7/26223; H04N 7/26228; H04N 7/26313; H04N 7/26335; H04N 7/26946; H04N 19/12; H04N 19/162; H04L 65/1059; H04L 65/604; H04L 65/607
USPC ....................................... 375/240.01–240.29
See application file for complete search history.

(56) References Cited

U.S. PATENT DOCUMENTS

| | | |
|---|---|---|
| 5,987,181 A | 11/1999 | Makiyama et al. |
| 6,181,711 B1 | 1/2001 | Zhang et al. |
| 6,624,761 B2 | 9/2003 | Fallon |
| 7,512,986 B2 | 3/2009 | Shen-Orr et al. |
| 7,646,432 B2 | 1/2010 | Park et al. |
| 7,647,619 B2 | 1/2010 | Kashima |
| 2002/0010859 A1* | 1/2002 | Maeda .......................... 713/176 |

(Continued)

OTHER PUBLICATIONS

Avaro, et al., "The MPEG-4 Systems and Description Language :A Way Ahead in Audio Visual Information Representation", Signal Processing: Image Communication, vol. 9, No. 4., May 1997.

(Continued)

*Primary Examiner* — Behrooz Senfi
(74) *Attorney, Agent, or Firm* — Knobbe Martens Olson & Bear LLP (57) ABSTRACT

Systems and methods for encoding, transmitting, and decoding are disclosed. The systems and methods include multimedia encoding, transmitting, and decoding instantiation systems which are capable of being modified on the basis of associated IPR costs. Further, the systems and methods include the capabilities of recording or transmitting the IPR and/or IPR costs associated with the instantiated encoders, transmitters, or decoders.

14 Claims, 6 Drawing Sheets

(56) References Cited

U.S. PATENT DOCUMENTS

| | | | |
|---|---|---|---|
| 2002/0018580 A1* | 2/2002 | Maeda | 382/100 |
| 2002/0035544 A1* | 3/2002 | Wakao et al. | 705/51 |
| 2002/0087999 A1 | 7/2002 | Kashima | |
| 2003/0163430 A1* | 8/2003 | Takaku | 705/52 |
| 2003/0193940 A1 | 10/2003 | Kugumiya | |
| 2004/0028141 A1 | 2/2004 | Hsiun et al. | |
| 2004/0067043 A1 | 4/2004 | Duruoz et al. | |
| 2004/0221143 A1 | 11/2004 | Wise et al. | |
| 2006/0056506 A1 | 3/2006 | Ho et al. | |
| 2006/0087457 A1 | 4/2006 | Rachwalski et al. | |
| 2006/0116966 A1* | 6/2006 | Pedersen et al. | 705/59 |
| 2006/0123455 A1* | 6/2006 | Pai et al. | 725/133 |
| 2006/0227815 A1 | 10/2006 | Khan | |
| 2006/0248235 A1 | 11/2006 | Eyer | |
| 2007/0200658 A1 | 8/2007 | Yang | |
| 2007/0274340 A1 | 11/2007 | Raveendran et al. | |
| 2007/0296613 A1 | 12/2007 | Hussain et al. | |
| 2008/0013562 A1 | 1/2008 | Fujinami et al. | |
| 2008/0027953 A1 | 1/2008 | Morita et al. | |
| 2008/0052540 A1* | 2/2008 | Inokuchi et al. | 713/193 |
| 2008/0066181 A1* | 3/2008 | Haveson et al. | 726/26 |
| 2008/0181400 A1* | 7/2008 | Guleryuz et al. | 380/231 |
| 2008/0243995 A1 | 10/2008 | Dong et al. | |
| 2008/0294691 A1 | 11/2008 | Chang et al. | |
| 2009/0016446 A1 | 1/2009 | Yang et al. | |
| 2009/0086104 A1 | 4/2009 | Felder | |
| 2009/0110067 A1 | 4/2009 | Sekiguchi et al. | |
| 2009/0154556 A1 | 6/2009 | Kim et al. | |
| 2009/0304115 A1 | 12/2009 | Pittaway et al. | |
| 2009/0310671 A1* | 12/2009 | Reynolds et al. | 375/240.01 |
| 2009/0313300 A1* | 12/2009 | Dettori et al. | 707/103 Y |
| 2010/0027974 A1 | 2/2010 | Ansari | |
| 2010/0046627 A1 | 2/2010 | Xiao et al. | |
| 2010/0195820 A1 | 8/2010 | Frank | |
| 2011/0061086 A1 | 3/2011 | Huang | |
| 2012/0069910 A1 | 3/2012 | Richardson et al. | |
| 2012/0072225 A1 | 3/2012 | Richardson et al. | |
| 2012/0250757 A1* | 10/2012 | Mabey et al. | 375/240.02 |
| 2012/0323758 A1* | 12/2012 | Henning | 705/37 |
| 2013/0188739 A1 | 7/2013 | Bystrom et al. | |

OTHER PUBLICATIONS

Bystrom et al., "A Fully Re-Configurable Universal Video Decoder", DASIP 09.

Kannangara et al., "A Universal Video Decoder for Fully Configurable Video Decoding" *ICCE 2010*.

Philip et al., "Decoder Description Syntax for Fully Configurable Video Coding", ICIP, Nov. 2009.

Richardson et al., "Fully Configurable Video Coding Part 1", ISO/IEC JTCI/SC20/WG11 document M16751, Jun. 2009.

Richardson et al., "Fully Configurable Video Coding Part 2", ISO/IEC JTCI/SC20/WG11 document M16752, Jun. 2009.

Richardson et al., "Implementing Fully Configurable Video Coding", ICIP, Nov. 2009.

Richardson et al., "A Framework for Fully Configurable Video Coding", PCS 2009.

International Preliminary Report on Patentability issued in International Patent Application No. PCT/US2011/52401 on Mar. 22, 2013.

International Preliminary Report on Patentability issued in International Patent Application No. PCT/US2011/52396 on Feb. 26, 2013.

International Preliminary Report on Patentability issued in International Patent Application No. PCT/US2011/52394 on Feb. 19, 2013.

International Search Report and the Written Opinion issued in International Patent Application No. PCT/US2013/23019 on Apr. 12, 2013.

OneCodec. "OneCodec: Future proof your media." (online) Sep. 23, 2011 1-10, 13-15 Available at http://vimeo.com/29476212. Retrieved on Mar. 14, 2013.

Angus, Andrew. "Dropbox: Video Sharing and Photo Sharing Made Easy" [blog post] http://www.switchvideo.com/blog/2011/05/09/dropbox-video-sharing-and-photo-sharing-madeeasy/ May 9, 2011 Switch Video. Retrieved on Mar. 14, 2013.

Europoean Telecommunications Standards Institute, Technical Specifications: Hybrid Broadcast Broadband TV, ETSI TS 102 796, (2012); 88 pages.

Gorin et al., "Just-In-Time Adaptive Decoder Engine: A Universal Video Decoder based on MPEG RVC", Proc $19^{th}$ ACM Inter'l Conference on Multimedia, New York, NY—USA (2011), 4 pages.

Gorin et al., "Optimized dynamic compilation of dataflow representations for multimedia applications", Annal Telecommun, Springer Verlag (2013) 68(3-4):133-151.

ISO/IEC 14496-12 Information technology—Coding of audio-visual objects—Part 12 ISO base media file format; International Organization for Standardization—$4^{th}$ Edition (2012); 196 pages.

ISO/IEC 14496-14 Information technology—Coding of audio-visual objects—Part 14 MP4 file format; International Organization for Standardization—$1^{st}$ Edition (2003); 18 pages.

Philp et al., "Decoder Description Syntax for Fully Configurable Video Coding", ICIP, Nov. 2009, pp. 769-772. [Corrected Author's spelling].

Richardson et al., "Dynamic transform replacement in an H.264 CODEC", $15^{th}$ IEEE International Conference on Image Processing (ICEP 2008) pp. 2108-2111.

International Search Report and Written Opinion issued in International Patent Application No. PCT/US2011/052396 on Jan. 24, 2012.

International Search Report issued in International Patent Application No. PCT/US2011/052394 on Feb. 7, 2012.

\* cited by examiner

SYSTEMS AND METHODS FOR ENCODING, TRANSMITTING AND DECODING

CROSS-REFERENCE TO RELATED APPLICATIONS

This application claims the benefit of the following U.S. Provisional Patent Applications: (1) U.S. App. No. 61/384,686, filed on Sep. 20, 2010; (2) U.S. App. No. 61/387,327, filed on Sep. 28, 2010; (3) U.S. App. No. 61/443,658, filed on Feb. 16, 2011; and (4) U.S. App. No. 61/443,660, filed on Feb. 16, 2011. Each of the above-referenced applications is hereby incorporated by reference in its entirety.

BACKGROUND

1. Field

The present technology relates to systems and methods for encoding, transmitting, and decoding multimedia data. More particularly, the technology relates to computer architecture and operating methods that can enable encoders, transmitters, and decoders to track usage of intellectual property and make decisions on the basis of intellectual property rights.

2. Description of the Related Art

Traditional multimedia encoding and decoding methods are predominantly proprietary or standardized. In this case, the video, audio or general multimedia is encoded in a fixed format and portions of the encoder and/or decoder are subject to licensing. Therefore, the entire encoder or decoder is typically subject to a single or small number of licensing agreements whether or not particular functionally that would be covered by one or more patents is ever used.

More specifically, multimedia encoders and decoders involve complex algorithms with encoding options that are dependent on inputs or parameters such as multimedia content, desired rate, distortion or complexity, and available system resources. Due to the dependencies between these inputs, within the encoders/decoders there are many branches in the algorithms that would choose to encode or decode using different functionality than other branches. Some of the functionalities may be covered by intellectual property, while others may not. Furthermore, the encoder or decoder may be licensed as a whole, or portions may be licensed separately. However, typically, even if algorithm branches containing particular functionally are never reached, the functionality is licensed as part of the encoder or decoder.

In a coding system encoding decisions may be made at a variety of scales. For example, a video encoder system may be configured to select between MPEG-2 or H.264 encoders. At a finer scale, even if an encoder is fixed, an encoding system may select between profiles or modes within the encoder. Furthermore, some of these methods may have associated intellectual property rights (IPR). At the decoder, decisions between methods or algorithms may be also made. As with the decoder decisions, these may depend upon a variety of parameters, and some methods may be subject to IPR. In some cases, the IPR in a coding system may be solely related to decoder methods.

Similarly, multiple methods may be available for transmission of the encoded multimedia. For instance, some transmitters may be configured as software radios and are therefore flexible in choice of transmission options such as data packaging, channel encoding, and modulation schemes. Other transmitters may be configured as multi-band or multi-mode transmitters, where some or all of the functionality is implemented in hardware. Other transmitters may have combinations of these configurations. In any of these cases, some or portions of some methods may be subject to licensing agreements. However, even if the covered methods are never used, the methods are typically licensed as part of the transmitter.

In addition to tracking IP usage, in certain instances, it would be beneficial to utilize transmission algorithms and/or encoding or decoding algorithms generated based on the content to be coded/transmitted, the IPR utilization in the transmission or coding algorithms, or other parameters of the system. This flexibility may result in more efficient transmission, encoding, or decoding of multimedia data. As long as a receiver is flexible, e.g., multi-band or multi-mode, the choice of band or transmission strategy can be left to a transmitter, as can the use of algorithms for channel encoding and modulation.

As an example of coding flexibility, within an encoder profile or mode, there may be multiple methods or algorithms for implementing specific necessary functions. These methods may differ in factors such as processing power, memory usage, or even compression ability. For instance, a fast version of a transform, e.g. a fast DCT as disclosed in U.S. Pat. No. 6,742,009, may be applied as opposed to a more time-consuming implementation.

However, decoders in devices that receive multimedia data with encoding methods that vary in response to the content or system parameters may not be configured to correctly decode this encoded content. This lack of configuration may be due to reasons such as a limit on the number of decoders able to be implemented in a device, no support for legacy decoders, and no support for new encoders. Furthermore, as with encoders, there may be multiple methods or algorithms for implementing specific necessary functions. These methods may differ in factors such as processing power, memory usage, or decompression performance.

SUMMARY

The systems, methods, and devices of described herein each may have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description" one will understand how the features of this technology provide advantages that include, without being limited thereto, enabling encoders, transmitters, and decoders to track Intellectual Property Rights (IPR) and IPR costs and/or to make configuration or other decisions based upon IPR and/or IPR costs.

Embodiments of systems and methods described herein provide for detecting and signaling the use of methods covered by IPR in encoders, decoders, and transmitters. Furthermore, embodiments described herein enable automatic reconfiguration of all or portions of encoders, transmitters, and decoders solely or in part on the basis of IPR utilization or costs of the algorithms in these systems.

One aspect of this disclosure is a multimedia encoding engine. The multimedia encoding engine comprises an IPR tracker. The IPR tracker is configured to determine the IPR used in or required for receiving and encoding the multimedia and/or transmitting the encoded multimedia, and/or decoding the encoded multimedia Another aspect of this disclosure is a transmitter engine which comprises a transmission decision component. The transmission decision component is configured to determine a transmission functionality for transmitting encoded multimedia data based on at least the IPR and/or IPR costs associated with transmission algorithms. In some aspects, the transmission functionality may be used to generate a transmitter. The transmitter may process data for transmission.

A third aspect of this disclosure is a data format comprising encoded multimedia data and an indication of IPR required for encoding, transmitting, and/or decoding the encoded multimedia data.

A fourth aspect of this disclosure is a multimedia decoding engine. The multimedia decoding engine comprises an IPR tracker. The IPR tracker is configured to determine the IPR used in or required for receiving and/or decoding the encoded multimedia and/or outputting the multimedia.

A fifth aspect of this disclosure is a multimedia processing engine which comprises an encoding decision component and an IPR signaler. The encoding decision component is configured to determine an encoding functionality for encoding multimedia data based on at least the IPR and/or IPR costs associated with encoding algorithms and/or decoding algorithms. The IPR signaler is configured to store or transmit the IPR or IPR costs associated with the selected encoding functionality. The engine also includes a decoding decision component that is configured to determine a decoding functionality corresponding to the encoding functionality and an encoder configured to encode the multimedia data using the determined encoding functionality. A processing unit configured to prepare the encoded multimedia data and the determined decoding functionality for communication to the decoder is also provided.

A sixth aspect of this disclosure is a multimedia processing engine which comprises a functionality interpreter. The functionality interpreter is configured to receive data corresponding to a functionality, generate the functionality based on the data and associated IPR costs, and instantiate a decoding algorithm using the functionality. The engine further includes a decoder configured to receive multimedia data, receive the decoding algorithm from the functionality interpreter, and decode multimedia data using the decoding algorithm.

A seventh aspect of this disclosure is a multimedia decoder instantiation system which comprises a functionality interpreter configured to receive configuration syntax elements and interpret the received syntax elements. The system further includes an instantiation system module configured to instantiate a decoder in response to the received syntax elements and decoding functionality selected from available functionality based on IPR and/or IPR costs associated with the available decoding functionality. A decoding module is also provided, and it is configured to decode received multimedia data. The decoding process is based on the interpreted syntax elements and selected functionality.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

The following detailed description is directed to certain specific embodiments. However, the teachings herein can be applied in a multitude of different ways, including for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, a system or apparatus may be implemented or a method may be practiced using any number of the aspects set forth herein. In addition, such a system or apparatus may be implemented or such a method may be practiced using other structure, functionality, or structure and functionality in addition to or other than one or more of the aspects set forth herein. In this description, reference is made to the drawings wherein like parts are designated with like numerals throughout.

Various embodiments of systems and methods are described herein for encoding, transmitting and decoding multimedia data. In the embodiments described herein, the systems and methods allow IPR used in encoding, transmitting and decoding multimedia data to be tracked and recorded or transmitted.

In one embodiment, the systems and methods described herein correspond to an encoder IPR tracker configured to determine the IPR utilized in a multimedia encoder, transmitter, and/or decoder in response to an input data stream.

Figure 1:
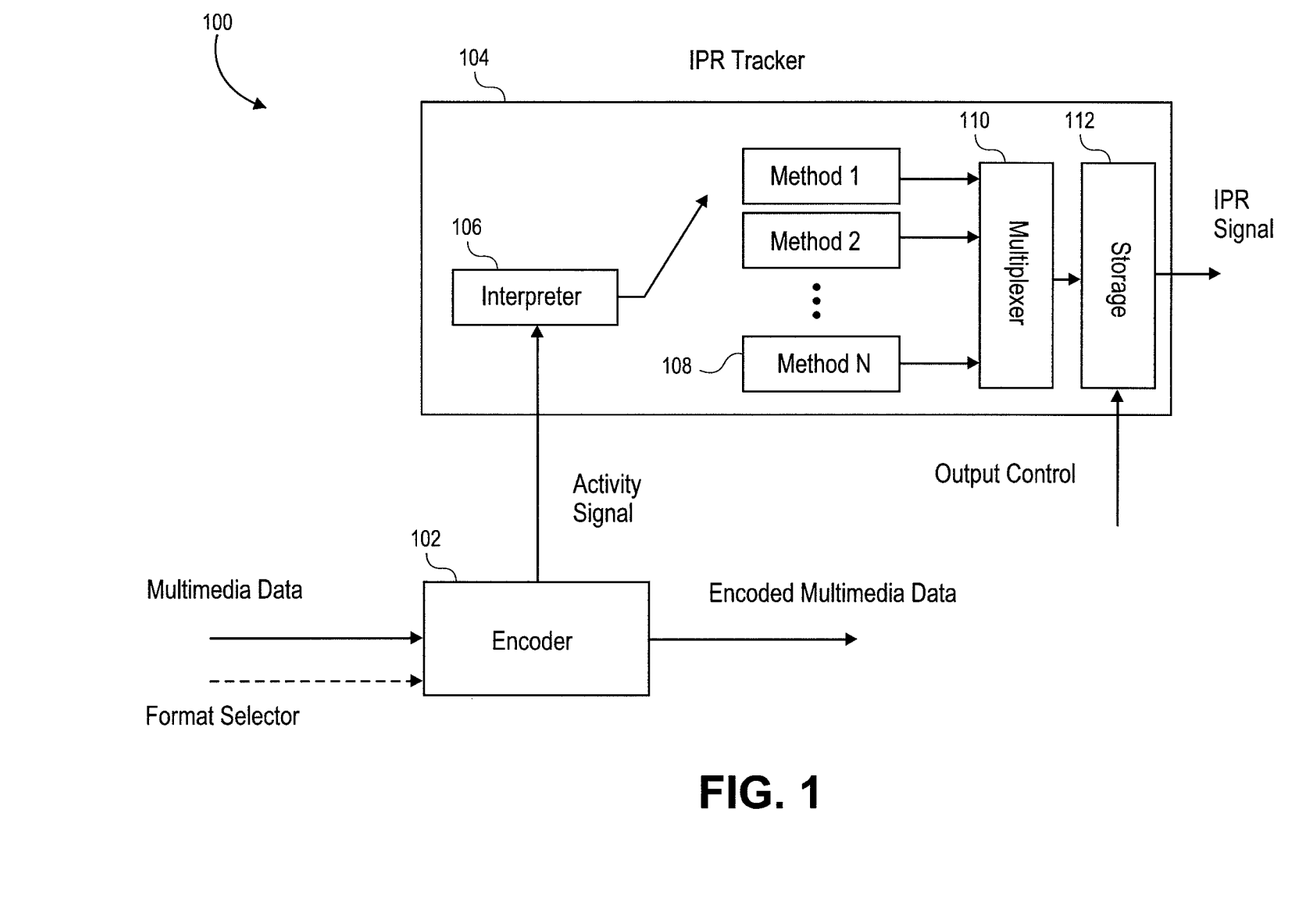
FIG. 1 is a block diagram illustrating a multimedia encoder with IPR tracker that performs techniques as described in this disclosure.

FIG. 1 is a block diagram illustrating a multimedia encoding and IPR tracking system 100 that may perform techniques as described in this disclosure. The system and IPR tracker 100 includes an encoder 102 configured to receive uncompressed multimedia data. The encoder 102 is in communication with an IPR tracker 104. The functionality of the components of the multimedia encoding and IPR tracking system 100 is discussed in detail below.

The multimedia encoder 102 may be configured to receive uncompressed multimedia data and to compress it according to a pre-selected format. Additionally or alternatively, if the multimedia encoder 102 is configured to operate in a number of profiles, modes, or levels, it may be configured to receive an input format selection signal. The optional input format selection signal may indicate to the multimedia encoder 102 which encoder, profile, level or mode to employ. The multimedia encoder 102 may be further configured to output a selected activity signal in response to activation of specific algorithms during encoding in response to the input data. For instance, if a standardized video encoder has multiple profiles and the incoming data produce operation in a particular profile, the encoder will detect and signal that use. In one embodiment, the encoder maintains a list of IPR required for each encoding profile and signals IPR use if the data are to be encoded in a particular profile. In another embodiment, the multimedia encoder 102 may signal the IPR to be used in the transmission of the encoded multimedia. In this embodiment the encoder may optionally maintain a list of IPR required for transmitting the encoded data in available transmission formats and signal required transmitter IPR if the data are to be transmitted using a particular method. In a further embodiment, the multimedia encoder 102 may signal the IPR to be used in the decoding of the encoded multimedia. In this embodiment the encoder may optionally maintain a list of IPR required for decoding data encoded in each encoding profile and signal decoder IPR required if the data are to be encoded in a particular profile. The latter two embodiments are particularly applicable when a codec such as a standardized codec is defined by its transmission and/or decoding methods rather than its encoding methods. The multimedia encoder 102 provides information about the utilized IPR to the IPR tracker 104.

The IPR tracker 104 is configured to receive the information about the activity and/or selection of an algorithm from the multimedia encoder 102 and to output an indication of the IPR required during encoding of the uncompressed data and/or transmitting and/or decoding of the encoded multimedia. In some embodiments, the IPR tracker may include an interpreter 106, a series of coding/transmission method modules 108, a multiplexer 110, and a storage unit 112. The interpreter 106 is typically configured to receive the information about the activity of an algorithm from the multimedia encoder 102. The interpreter translates this activity signal to control a switch that switches between elements in the series of coding/transmission method modules 108. When one of the coding/transmission method modules is put into communication with the interpreter 106 via operation of the switch, it outputs a signal to indicate the IPR rights corresponding to its associated coding/transmission method or algorithm. The series of coding/transmission method modules 108 may be in direct communication with the multiplexer 110. The multiplexer 110, in turn, may be in communication with storage unit 112. The multiplexer 110 formats the incoming signals and outputs a resulting formatted signal to storage unit 112. The storage unit 112 can immediately (or upon reception of an output control signal) output the formatted IPR rights indicator signal.

Figure 2:
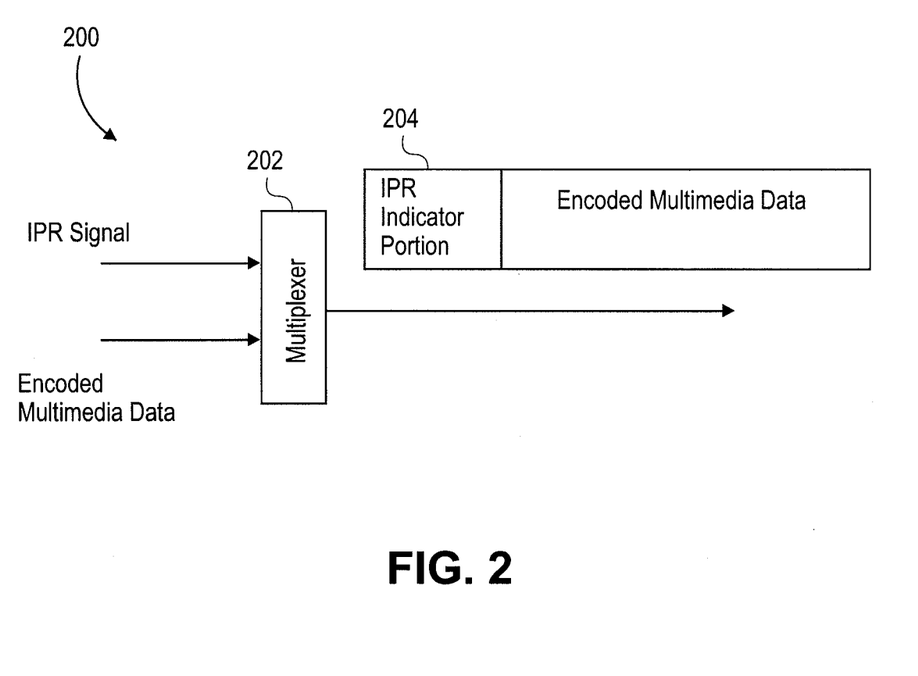
FIG. 2 is a block diagram illustrating a data format produced in response to techniques performed as described in this disclosure.

FIG. 2 is a block diagram of a multiplexing system 200 illustrating the multiplexing of the compressed multimedia output by the multimedia encoder and IPR tracker 100 with the IPR signal output by the multimedia encoder and IPR tracker 100. The multiplexer 202 is configured to receive a compressed multimedia stream output by the encoder 102 of FIG. 1. The multiplexer 202 is also configured to receive the IPR signal output by the IPR tracker 104 of FIG. 1. The multiplexer 202 combines the two inputs to produce a joint stream 204 which contains at least one IPR indicator portion and at least one encoded multimedia portion.

Figure 3:
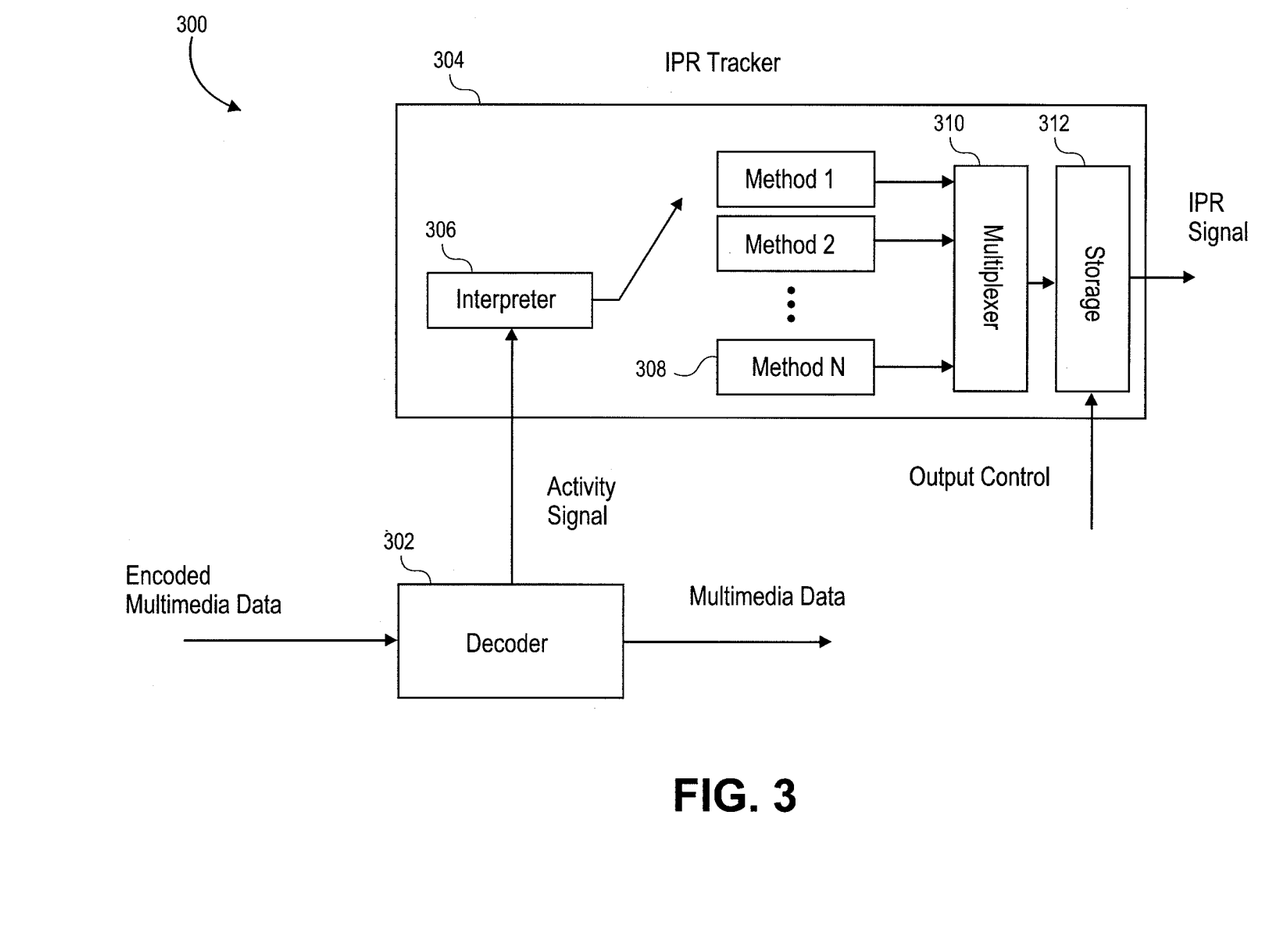
FIG. 3 is a block diagram illustrating an encoded multimedia decoder that performs techniques as described in this disclosure.

FIG. 3 is a block diagram illustrating a compressed multimedia decoding and IPR tracking system 300 according to one or more embodiments. In the embodiment shown in FIG. 3, the compressed multimedia decoding and IPR tracking system 300 includes a decoder 302 configured to receive compressed multimedia data. The decoder 302 is in communication with an IPR tracker 304. The functionality of the components of the compressed multimedia decoder and IPR tracker 300 is discussed in detail below.

The compressed multimedia decoder 302 may be configured to receive compressed multimedia data and to decode or decompress it according to a pre-selected format. In some embodiments, the compressed multimedia decoder 302 is further configured to output a selected activity signal in response to activation of specific algorithms or methods during decoding in response to the input data. For instance, if a standardized video decoder has multiple profiles and the incoming data produce operation in a particular profile, the decoder 302 will detect and signal that use. The compressed multimedia decoder 302 provides information about the detected algorithms or methods to the IPR tracker 304.

The IPR tracker 304 may be configured to receive the information about the activity of an algorithm from the compressed multimedia decoder 302 and to output an indication of the IPR required during decoding of the compressed data. The IPR tracker typically includes an interpreter 306, a series of decoding method modules 308, a multiplexer 310, and a storage unit 312. In some embodiments, the interpreter 306 is configured to receive the information about the activity of an algorithm or method from the compressed multimedia decoder 302. The interpreter translates this activity signal to control a switch that switches between elements in the series of decoding method modules 308. When one of the decoding method modules is put into communication with the interpreter 306 via operation of the switch, it outputs a signal to indicate the IPR rights corresponding to its associated decoding method or algorithm. The series of decoding method modules 308 may be in direct communication with the multiplexer 310. The multiplexer 310, in turn, may be in communication with storage unit 312. The multiplexer 310 formats the incoming signals and outputs a resulting formatted signal to storage unit 312. The storage unit 312 can immediately or upon reception of an output control signal output the formatted IPR rights indicator signal.

Figure 4:
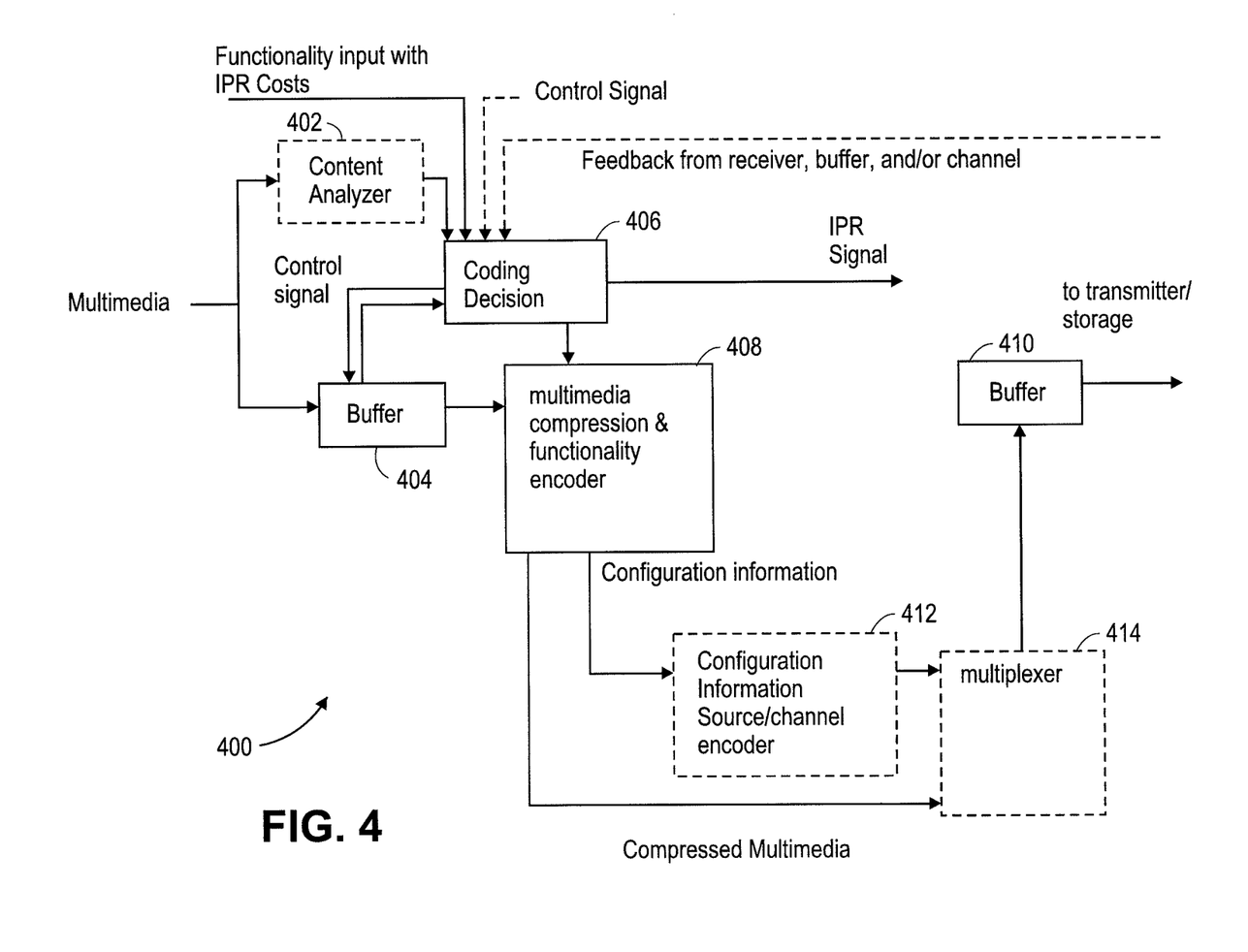
FIG. 4 is a block diagram illustrating a reconfigurable multimedia encoder that performs techniques as described in this disclosure.

FIG. 4 is a block diagram illustrating an example of a reconfigurable multimedia encoder in accordance with one or more embodiments. In the embodiment shown, the encoder 400 includes an optional content analyzer 402 and a first buffer 404 each configured to receive multimedia data. Each of the optional content analyzer 402 and the first buffer 404 are in communication with a coding decision component 406. The coding decision component 406 and the first buffer 404 are further in communication with a multimedia compression and functionality encoder 408. In one embodiment, the multimedia compression and functionality encoder 408 is directly in communication with a second buffer 410. Optionally, the multimedia compression and functionality encoder 408 is in communication with a configuration information source/channel encoder 412 and/or a multiplexer 414. The configuration information source/channel encoder 412 is also optionally in communication with the multiplexer 414. The functionality of the various components of the encoder 400 is discussed in additional detail below.

The content analyzer 402 is configured to receive uncompressed multimedia data for analysis. The content analyzer 402 is configured to analyze the content of the multimedia data in order to detect features and/or attributes, which may be referred to as characteristics, in the multimedia data. For example, the content analyzer 402 detects activity in the multimedia data, changes in correlation between audio or video samples, luminance range for video data, audio range for audio data, frequency changes in audio data, color levels of the video data, motion changes in the video data, texture in the video data, scene changes of the video data, etc. A skilled artisan will appreciate that the content analyzer 402 may be configured to analyze more or fewer features and/or attributes in the multimedia data. The content analyzer 402 further provides information about the detected features to the coding decision component 406. It should be noted that in some embodiments, the encoder 400 may not include the content analyzer 402.

The coding decision component 406 comprises two sub-components, an encoding decision component and a decoding decision component. The coding decision component 406 is typically configured to receive the information about detected features of the multimedia data from the content analyzer 402. The coding decision component 406 may be further configured to receive functionality input from a local library (e.g., a memory store), a non-local library of functions (e.g., an external device comprising a memory store), from an algorithmic configuration generator, and/or from a user. The libraries may be updated with new functionalities at any time. The functions may correspond to encoding, decoding, and/or pre-/post-processing algorithms, entropy code tables, transforms, variable length code selection changes, compression techniques, reconstruction techniques, and/or other suitable data that can be used to encode the multimedia data and/or decode the encoded multimedia data. Some or all of the functionality has associated with it IPR costs. The coding decision component 406 is further configured to receive the multimedia data from the content analyzer 402 or the buffer 404.

Utilizing input IPR costs and/or additional available information about the detected features of the multimedia data, the functionality input, and/or additional input(s), collectively which may be referred to as parameters, the coding decision component 406 determines how to encode the multimedia data and/or decode the encoded multimedia data. Examples of additional parameters may include: a power source of the decoder, a processing power of the decoder, a memory availability of the decoder, an available configuration time period of the decoder, a channel for transmitting the functionality, etc. In one embodiment, the coding decision component 406 may select certain functions from the functionality input for coding portions of the multimedia data. Decisions on coding of the multimedia data may be made on the basis of a coding unit of the multimedia data. The size of the coding unit may be variable or fixed. The coding unit for video may be, for example, as small as a pixel of video data, a block of video data within a frame of video data, an entire frame of video data, several frames of video data etc. The coding unit for audio may be, for example, a single sample, a plurality of samples of audio, a single channel of audio, a plurality of channels of audio, a subframe of audio, a frame of audio, etc.

The coding decision component 406 may use a cost measure in making a decision on encoding and decoding method for the coding unit as would be known to one skilled in the art. The measure may be, for example, a cost function such as $J=R+\lambda_1 I+\lambda_2 D+\lambda_3 C_E+\lambda_4 C_D$, where R is the rate or estimated rate of the compressed data plus the configuration information and overhead, I is the IPR cost, D is the distortion or estimated distortion of the reconstructed data, measured by any convenient measure, $C_E$ is the complexity allowance of the encoder measured by a convenient measure, and $C_D$ is the complexity allowance of the receiver(s) measured by a convenient measure. Different weights, labeled $\lambda$, may be given to the criteria (e.g., R, I, D, $C_E$, and $C_D$) as would be understood by one of ordinary skill in the art. The measure J may be the overall cost of the functionality evaluated, where a higher cost corresponds to a lower rating of the functionality. It should be noted that other criteria/characteristics may be used as well.

The coding decision component 406 sends the determined functionality for coding the coding unit(s) to the compression and functionality encoder 408. The coding decision component 406 may further output a signal about the IPR utilized in the selected functionality.

The compression and functionality encoder 408 receives the coding unit from the coding decision component 406 or the first buffer 404 and compresses the coding unit based on the encoding functionality received from the coding decision component 406. Further, the multimedia compression and functionality encoder 408 encodes the decoding functionality received from the coding decision component 406. For example, the functionality for decoding the encoded coding unit is mapped to one or more syntax elements, such as codewords, with optional overhead information. The codeword may correspond to an encoded version of the functionality data that is decodable by a decoder. The overhead information may correspond to information used by the decoder to identify and/or decode the syntax elements such as a header that identifies the length of the data segment containing syntax elements. The syntax elements and optional overhead information are sent to either the optional configuration information source/channel encoder 412, to the optional multiplexer 414, or directly to the second buffer 410. The compressed multimedia data corresponding to the coding unit are sent either to the optional multiplexer 414 or directly to the second buffer 410.

The configuration information source/channel encoder 412 may be configured to receive the syntax elements and optional overhead information from the compression and functionality encoder 408. It may be further configured to source encode the syntax elements and overhead information. Various source encoding configurations may be used, such as entropy encoding, as would be understood by a skilled artisan. Alternatively or additionally, it may be configured to channel encode the syntax elements and overhead information or the source-encoded data. Various channel encoding configurations may be used as would be understood by a skilled artisan. The configuration information source/channel encoder 412 may then transmit the source/channel encoded data to either the multiplexer 414 or directly to the second buffer 410.

In the embodiment shown in FIG. 4, the multiplexer 414 is configured to receive the compressed multimedia data corresponding to the coding unit from the multimedia compression and functionality encoder 408. The multiplexer is further configured to receive the one or more syntax elements and optional overhead information directly from the compression and functionality encoder 408, or source/channel encoded syntax elements and optional overhead information from the configuration information source/channel encoder 412. The multiplexer 414 is configured to multiplex the syntax elements and optional overhead information (source/channel encoded or not) with the compressed multimedia data to form a single set of bits of data or bitstream corresponding to both pieces of data. The multiplexer 414 is configured to send the multiplexed data to the second buffer 410.

The second buffer 410 is configured to receive the syntax elements and optional overhead information, as well as the compressed multimedia data. The second buffer 410 may receive the syntax elements and optional overhead information as a first bitstream and the compressed multimedia data as a second bitstream. For example, if the encoder 400 does not include the optional multiplexer 414, the second buffer 410 receives the compressed multimedia data directly from the compression and functionality encoder 408 and receives the syntax elements and optional overhead information from either the compression and functionality encoder 408 or the configuration information source/channel encoder 412 as discussed above. Alternatively, the second buffer 410 receives the syntax elements and optional overhead information multiplexed with the compressed multimedia data as a single bitstream.

Figure 5:
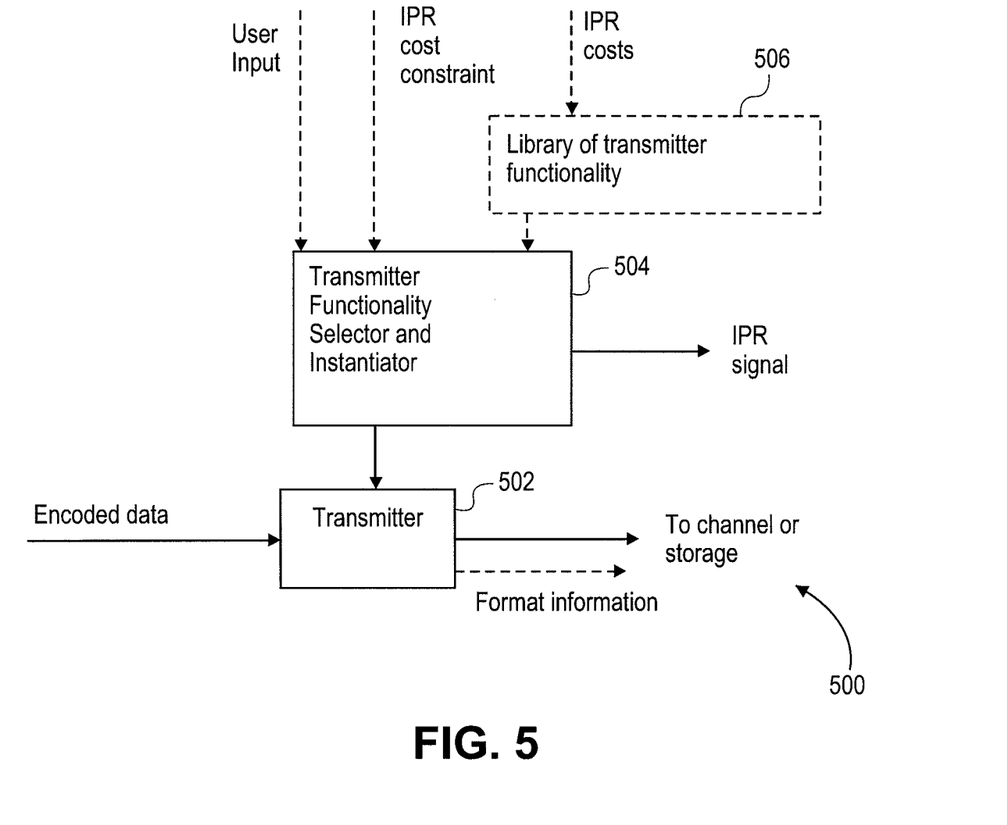
FIG. 5 is a block diagram illustrating a reconfigurable transmitter that performs techniques as described in this disclosure.

The second buffer 410 may output the bitstream(s) to a storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media (e.g., DVD, Blu-Ray, CD, etc.), and the like. The storage medium may be accessible by the receiver/decoder. Additionally or alternatively, the second buffer 410 outputs the bitstream(s) for wired or wireless transmission to the receiver/decoder. For example, the second buffer 410 may output the bitstream(s) to an appropriate transmitter such as illustrated in FIG. 5 for transmitting the bitstream(s) to the receiver/decoder over one or more communication channels. In some embodiments, where there is no multiplexer 414 before the second buffer 410 to multiplex the first bitstream and the second bitstream, there may be a multiplexer after the second buffer 410 that multiplexes the first bitstream and the second bitstream before output to one of the above components.

FIG. 5 is a block diagram illustrating one example of a reconfigurable compressed multimedia transmitter 500 in accordance with one or more inventive aspects. In this example, the reconfigurable transmitter 500 includes a transmitter 502 configured to receive compressed multimedia data, format the compressed data for transmission, and output the formatted data to storage or a channel. The reconfigurable transmitter 500 further includes a transmitter functionality selector and instantiator 504 in communication with the transmitter. The reconfigurable transmitter 500 further optionally includes a library of transmitter functionality 506 in communication with the transmitter functionality selector and instantiator 504. The library of transmitter functionality 506 can optionally receive updates of IPR costs or other IPR information associated with functionality in the library.

The transmitter functionality selector and instantiator 504 may be optionally configured to receive input from a user which may include functionality or indicators of selected functionality with associated IPR costs. The transmitter functionality selector and instantiator 504 may be further optionally configured to receive input about an overall IPR cost constraint or other constraint dependent on IPR. The transmitter functionality selector and instantiator 504 may be further optionally configured to receive functionality with associated IPR costs from a library of transmitter functionality 506. Utilizing any available information and cost constraints, the transmitter functionality selector and instantiator 504 determines transmitter functionality on the basis of IPR costs and/or potentially on the basis of additional parameters. For example, the transmitter functionality selector may choose multiple access technology such as CDMA or algorithms that have associated IPR licensing fees, or alternatively may choose unlicensed multiple access technology such as FDMA, or methods without associated IPR licensing fees. The transmitter functionality selector may make this selection on the basis of an IPR cost constraint and/or the resulting performance of the transmitter when alternative transmission methods are utilized. As an example, the transmitter may select a fast algorithm for channel encoding the input data, if the IPR cost of the algorithm does not exceed a cost constraint, otherwise the transmitter may select a slower algorithm with no associated IPR costs. The transmitter functionality selector and instantiator 504 instantiates the transmitter 502 by techniques that may include selecting hardware or software that performs the determined functionality, by interconnecting components, or by compiling software routines The transmitter functionality selector and instantiator 504 further signals the IPR utilized in the instantiated transmitter. The transmitter 502 optionally outputs a format signal to the receiver to indicate the transmission techniques employed.

Figure 6:
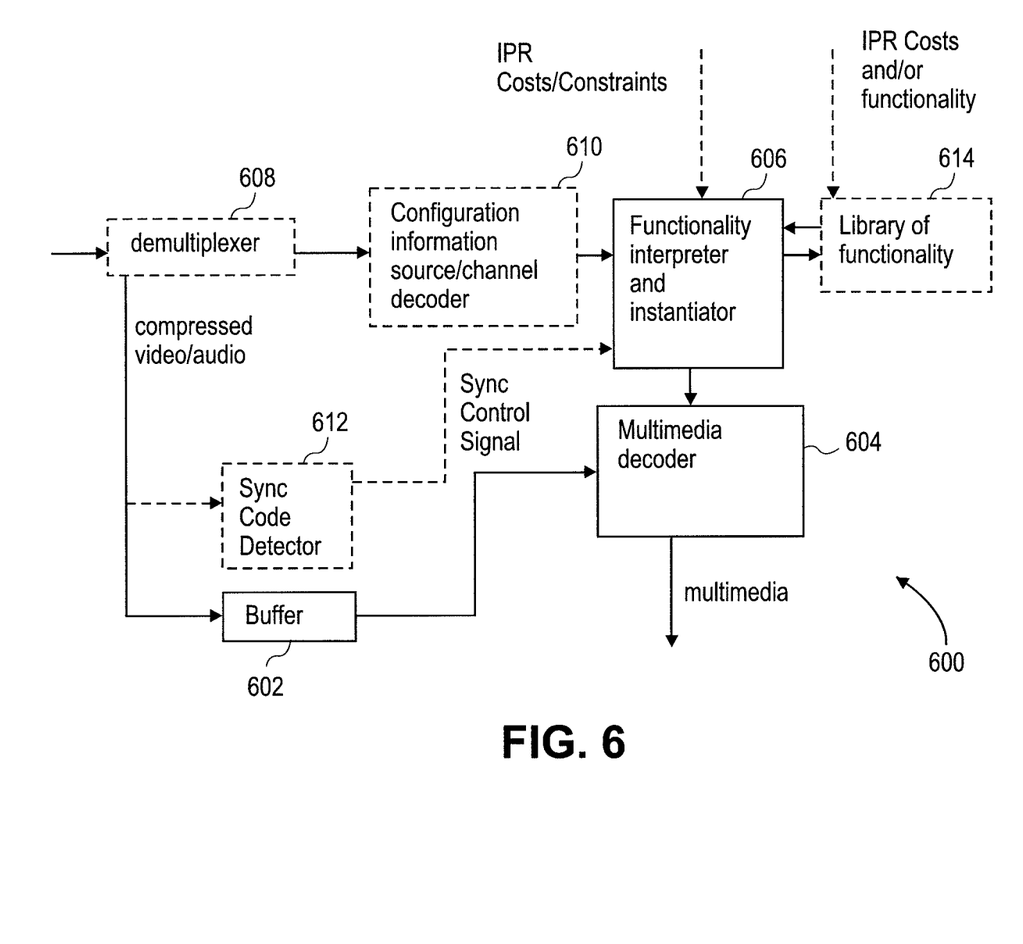
FIG. 6 is a block diagram illustrating a reconfigurable multimedia decoder that performs techniques as described in this disclosure.

FIG. 6 is a block diagram illustrating a reconfigurable decoder system 600 in accordance with one or more inventive aspects. The reconfigurable decoder 600 includes a buffer 602 in communication with an encoded multimedia decoder 604. The encoded multimedia decoder 604 is further in communication with a functionality interpreter and instantiator 606. The reconfigurable decoder 600 optionally includes a demultiplexer 608 in communication with the buffer 602 and the functionality interpreter and instantiator 606 (directly or via a configuration information source/channel decoder 610). The reconfigurable decoder 600 further optionally includes the configuration information source/channel decoder 610 in communication with the functionality interpreter and instantiator 606. The configuration information source/channel decoder 610 is further in communication with the optional demultiplexer 608, if included in the reconfigurable decoder 600. The demultiplexer 608 is further in communication with an optional sync code detector 612, which is further in communication with the functionality interpreter and instantiator 606. In addition, the functionality interpreter and instantiator 606 may be in communication with an optional library of functionality 614. The functionality of components of the reconfigurable decoder 600 is described in further detail below.

The presence or absence of optional components in the reconfigurable decoding system 600 may be based on the configuration of components of a corresponding encoder (e.g., encoder 400) that sends encoded multimedia data to the system 600 for decoding, although this is not a requirement. For example, if multimedia data sent from an encoder to the decoder 600 are multiplexed as discussed above with respect to FIG. 4, the decoder may include the demultiplexer 608 to demultiplex the multiplexed data. In addition, if the decoder configuration information data received from the encoder are source/channel encoded as discussed above with respect to FIG. 4, the decoder 600 may include the source/channel decoder 610 to decode the decoder configuration information data.

The buffer 602 may be configured to receive encoded multimedia data from an encoder such as the encoder discussed above with respect to FIG. 4. In some embodiments, the buffer 602 may receive the encoded multimedia data as a bitstream directly from the encoder. Alternatively, the encoder may send a bitstream with the encoded multimedia data multiplexed with syntax elements and optional overhead information corresponding to a functionality. In these instances, the demultiplexer 608 may receive the bitstream and demultiplex the data into an encoded multimedia data bitstream with the encoded multimedia data, and a functionality data bitstream with the syntax elements and optional overhead information. The demultiplexer 608 may then send the encoded multimedia data bitstream to the buffer 602 and optionally to the sync code detector 612. The demultiplexer 608 further sends the functionality data bitstream to the configuration information source/channel decoder 610 and/or the functionality interpreter and instantiator 606.

The configuration information source/channel decoder 610 is typically configured to source and/or channel decode the functionality data bitstream when the data are source and/or channel encoded by the encoder. The configuration information source/channel decoder 610 may also be configured to send the decoded functionality data bitstream to the functionality interpreter and instantiator 606.

The sync code detector 612 is typically configured to determine whether the compressed multimedia data bitstream includes a multiplexed sync code that identifies the functionality associated with the coding unit in the compressed multimedia data bitstream. The sync code detector 612 may be further configured to demultiplex the sync code and the compressed multimedia data and send a control signal to the functionality interpreter and instantiator 606 that indentifies the functionality data bitstream that is associated with the coding unit.

The functionality interpreter and instantiator 606 receives the functionality data bitstream, which includes syntax elements and optional overhead information, as discussed above. Furthermore, the functionality interpreter and instantiator 606 receives IPR costs associated with the functionality. The functionality interpreter and instantiator 606 uses the IPR costs associated with the functionality to select between available functionality. The functionality interpreter and instantiator 606 has an optional input of IPR costs or an IPR constraint. The functionality interpreter and instantiator 606 maps the syntax elements to the correct functionality. For example, the syntax elements may map to particular syntax elements such as processing elements, structures, and or code segments. The syntax elements may alternatively be used to indicate selected functionality from the optional library of functionality 614. The functionality interpreter and instantiator 606 may make the selection between functionality before or after mapping of the syntax elements to the functionality. Based on these selected syntax elements or functionality, the functionality interpreter and instantiator 606 instantiates a decoder. For example, the functionality interpreter and instantiator 606 interconnects, parameterizes, deletes or replaces existing syntax elements used by the multimedia decoder 604. Additionally or alternatively, the functionality interpreter and instantiator 606 may generate machine code or hardware organization and links the code or organization with the multimedia decoder 604, thus reconfiguring the multimedia decoder 604 based on the received functionality. In another example, the functionality interpreter and instantiator 606 may cause the multimedia decoder 604 to reconfigure a data path used for decoding multimedia data, such as by reconfiguring an electronic circuit. In still another embodiment, the functionality interpreter and instantiator 606 may generate machine code segments based on the syntax elements for decoding the multimedia data. In another embodiment, the functionality interpreter and instantiator 606 comprises a compiler configured to generate compiled code segments based on the syntax elements. The functionality interpreter and instantiator 606 may further link the complied code segments to instantiate a decoder. In another embodiment, the functionality interpreter and instantiator 606 parameterizes software code segments based on the syntax elements. The functionality interpreter and instantiator 606 may further utilize the sync control signal form the sync code detector 612 to configure the encoded multimedia decoder 604 with the correct functionality at the same time the multimedia decoder 604 receives the coding unit associated with the functionality.

Additionally, the reconfigurable decoder 600 includes an optional library of functionality 614 in communication with the functionality interpreter and instantiator 606. The functionality interpreter and instantiator 606 may store received functionalities and their associated IPR costs in the library of functionality 614 and later access the functionalities and their associated IPR costs as necessary to reconfigure the multimedia decoder 604 as opposed to regenerating machine code and/or hardware organization. This may reduce the computational requirements for switching to a previously used functionality, but increases the memory needed to store previous functionalities. Alternatively, the library of functionality 614 may be predetermined or may be updated by the user to include new or updated functionality and/or associated IPR costs. The optional library of functionality 604 may comprise internal or external memory.

The multimedia decoder 604 may be configured by the functionality interpreter and instantiator 606 as discussed above. The multimedia decoder 604 may further receive coding units to be decompressed according to the functionality from the buffer 602. The multimedia decoder 604 may then decompress the compressed coding unit and output the decoded multimedia data. The multimedia decoder 604 may comprise a field programmable gate array (FPGA) or other suitable configurable circuitry.

The technology is operational with numerous other general purpose or special purpose computing system environments or configurations. Examples of well known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN), personal area network (PAN), or Wide Area Network (WAN) may be a home or corporate computing network, including access to the Internet, to which computers and computing devices comprising the system are connected. In one embodiment, the LAN conforms to the Transmission Control Protocol/Internet Protocol (TCP/IP) industry standard.

As used herein, multimedia and multimedia data refer to images, graphics, sounds, video, animations, electronic documents, scientific data, or any other digital data type data that is entered into the system.

As used herein, encoded digital data refers to data that are stored or held in a data format, which may be compressed or uncompressed.

As used herein, decode refers to decompression, interpretation, playback or conversion.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system is comprised of various modules/components as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

A web browser comprising a web browser user interface may be used to display information (such as textual and graphical information) to a user. The web browser may comprise any type of visual display capable of displaying information received via a network. Examples of web browsers include Microsoft's Internet Explorer browser, Netscape's Navigator browser, Mozilla's Firefox browser, PalmSource's Web Browser, Apple's Safari, or any other browsing or other application software capable of communicating with a network.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the above description has pointed out novel features of the technology as applied to various embodiments, the skilled person will understand that various omissions, substitutions, and changes in the form and details of the device or process illustrated may be made without departing from the scope of the instant technology. Therefore, the scope of the technology is defined by the appended claims rather than by the foregoing description. All variations coming within the meaning and range of equivalency of the claims are embraced within their scope.

What is claimed is:

1. A multimedia encoding engine comprising:
an encoder configured to:
identify intellectual property rights (IPR) for utilizing each of a first and second encoding algorithm for encoding unencoded multimedia data;
select the first encoding algorithm instead of the second encoding algorithm for encoding the unencoded multimedia data based at least in part on the identified intellectual property rights;
encode the unencoded multimedia data using the selected algorithm;
identify second intellectual property rights (IPR) for utilizing each of a first or second output algorithm for the encoded multimedia data;
select the first output algorithm instead of the second output algorithm for outputting the encoded multimedia data based on the identified second intellectual property rights; and
output the encoded multimedia data utilizing the selected output algorithm.

2. The multimedia encoding engine of claim 1, wherein an indication of the identified IPR is output by the multimedia encoding engine.

3. The multimedia encoding engine of claim 1, wherein an indication of the identified IPR is multiplexed with the encoded multimedia data.

4. The multimedia encoding engine of claim 1, wherein an indication of the identified IPR is recorded.

5. The multimedia encoding engine of claim 1, wherein the encoder is further configured to calculate a cost associated with the identified IPR.

6. The multimedia encoding engine of claim 5, wherein the encoder is further configured to select the algorithm for encoding based at least in part on the calculated cost associated with the identified IPR.

7. A multimedia decoding engine comprising:
a decoder configured to:
receive a data bitstream;
identify intellectual property rights (IPR) for utilizing each of a first and second decoding algorithm to, decode encoded multimedia data based on the received data bitstream;
select the first algorithm instead of the second algorithm for decoding the encoded multimedia data based on the identified intellectual property rights;
decode the encoded multimedia data using the selected decoding algorithm;
identify second intellectual property rights (IPR) for utilizing each of a first and second output algorithm for outputting the decoded multimedia data;
select the first output algorithm instead of the second output algorithm based on the identified second intellectual property rights; and
utilize the selected output algorithm to output the decoded multimedia data in response to the selection.

8. The multimedia decoding engine of claim 7, wherein an indication of the identified IPR is recorded.

9. The multimedia decoding engine of claim 7, wherein an indication of the identified IPR is output by the multimedia decoding engine.

10. The multimedia decoding engine of claim 7, wherein an indication of cost associated with the identified IPR is calculated.

11. The multimedia decoding engine of claim 7, wherein the decoder is further configured to:
IPR costs associated with the identified IPR based on the data bitstream;
select the first algorithm instead of the second algorithm based at least in part on the costs associated with the identified IPR.

12. The multimedia encoding engine of claim 1, wherein the encoder is further configured to:
identify third intellectual property rights (IPR) for utilizing each of a first or second receiving algorithm for the unencoded multimedia data;
select the first receiving algorithm instead of the second receiving algorithm based on the identified third intellectual property rights; and
utilize the selected algorithm to receive the unencoded multimedia data into the encoding engine.

13. The multimedia encoding engine of claim 1, wherein the encoder is further configured to:
identify third intellectual property rights (IPR) for utilizing each of a first and second decoding algorithm to decode the encoded multimedia data in a decoder;
select the first decoding algorithm instead of the second decoding algorithm based on the identified third intellectual property rights;
encode an indicator of the selected decoding algorithm with the encoded multimedia data; and
output the encoded indicator of the selected decoding algorithm with the encoded multimedia data.

14. The multimedia decoding engine of claim 7, wherein the decoder is further configured to:
identify second intellectual property rights (IPR) for utilizing each of a first and second receiving algorithm to receive the encoded multimedia data into the decoding engine;
select the first receiving algorithm instead of the second receiving algorithm based on the identified second intellectual property rights; and
utilize the selected receiving algorithm to receive the encoded multimedia data into the decoding engine in response to the selection.

* * * * *